United States Patent
Schreter et al.

(10) Patent No.: US 10,409,864 B2
(45) Date of Patent: Sep. 10, 2019

(54) TRANSACTION CONTROL BLOCK FOR MULTIVERSION CONCURRENCY COMMIT STATUS

(71) Applicant: SAP SE, Walldorf (DE)

(72) Inventors: Ivan Schreter, Mannheim (DE); Chang-Gyoo Park, Seoul (KR)

(73) Assignee: SAP SE, Walldorf (DE)

( * ) Notice: Subject to any disclaimer, the term of this patent is extended or adjusted under 35 U.S.C. 154(b) by 1007 days.

(21) Appl. No.: 14/552,808

(22) Filed: Nov. 25, 2014

(65) Prior Publication Data
US 2016/0147906 A1 May 26, 2016

(51) Int. Cl.
| | |
|---|---|
| *G06F 17/30* | (2006.01) |
| *G06F 16/9038* | (2019.01) |
| *G06F 16/18* | (2019.01) |
| *G06F 16/23* | (2019.01) |

(52) U.S. Cl.
CPC ...... *G06F 16/9038* (2019.01); *G06F 16/1873* (2019.01); *G06F 16/2322* (2019.01)

(58) Field of Classification Search
None
See application file for complete search history.

(56) References Cited

U.S. PATENT DOCUMENTS

| | | | |
|---|---|---|---|
| 5,530,851 A | 6/1996 | Fortier | |
| 2011/0302143 A1* | 12/2011 | Lomet | G06F 17/30008 707/704 |
| 2013/0060742 A1* | 3/2013 | Chang | G06F 17/30359 707/704 |
| 2014/0149353 A1 | 5/2014 | Lee et al. | |
| 2015/0278281 A1* | 10/2015 | Zhang | G06F 17/30008 707/703 |

OTHER PUBLICATIONS

Extended European Search Report for Application No. 15003117.7 dated Feb. 12, 2016, 9 pages.
"Multiversion concurrency control" Wikipedia, the free encyclopedia, Oct. 10, 2014, https://en.wikipedia.org/w/index.php?title=Multivesion_concurrency_control&oldid=629074094, 7 pages.

* cited by examiner

*Primary Examiner* — Aleksandr Kerzhner
*Assistant Examiner* — Eddy Cheung
(74) *Attorney, Agent, or Firm* — Sterne, Kessler, Goldstein & Fox P.L.L.C.

(57) ABSTRACT

Disclosed herein are system, method, and computer program product embodiments for utilizing a transaction control block for providing reader-writer access to transaction commit status. An embodiment operates by receiving a row read request and determining that the row is versioned. The system determines that a first timestamp information for a row destroy transaction associated with the row exists in a transaction control block and retrieves the first timestamp information from the transaction control block.

18 Claims, 17 Drawing Sheets

Check CTS

US 10,409,864 B2

TRANSACTION CONTROL BLOCK FOR MULTIVERSION CONCURRENCY COMMIT STATUS

BACKGROUND

Background

Database management systems can use multiversion concurrency control (MVCC) as a mechanism for providing multiple readers or writers with concurrent access to the database. Generally, concurrency control methods can be used to prevent readers from accessing half-written or inconsistent data due to the read being performed concurrently with a write operation. MVCC accomplishes this by providing users with access to a snapshot of the database at a particular instant in time, typically the instant when the user initiated the read operation. Any changes made by a writer are not seen by others until the write transaction is completed, or "committed."

To provide these snapshots, a MVCC database may store multiple versions of its data. For example, when the database updates an item of data, instead of overwriting the old data with the new data, the database marks the old data as obsolete and adds the new data, marking the new data as a newer version. Using the multiple stored versions, the database allows readers to access data that was valid when the reader initiated the read operation, even if the data is being overwritten by a concurrent writer. The database provides readers with the new value after the write transaction is committed.

Committing a transaction typically involves updating the version information for all the database values involved in the transaction. This may incur long latencies that affect database performance.

BRIEF DESCRIPTION OF THE DRAWINGS

The accompanying drawings are incorporated herein and form a part of the specification.

FIGS. 2A-I illustrates a multiversion concurrency control (MVCC) structure maintained by transaction manager for providing multiversion concurrency control and the contents of the MVCC structure as a sequence of database transactions take place, according to an example embodiment.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for utilizing a transaction control block for providing reader-writer access to transaction commit status.

While the embodiments described herein are exemplified in the context of a database management system, they are generally applicable to any system that uses multiversion concurrency control (e.g., programming languages that implement transactional memory, etc.)

Figure 1:
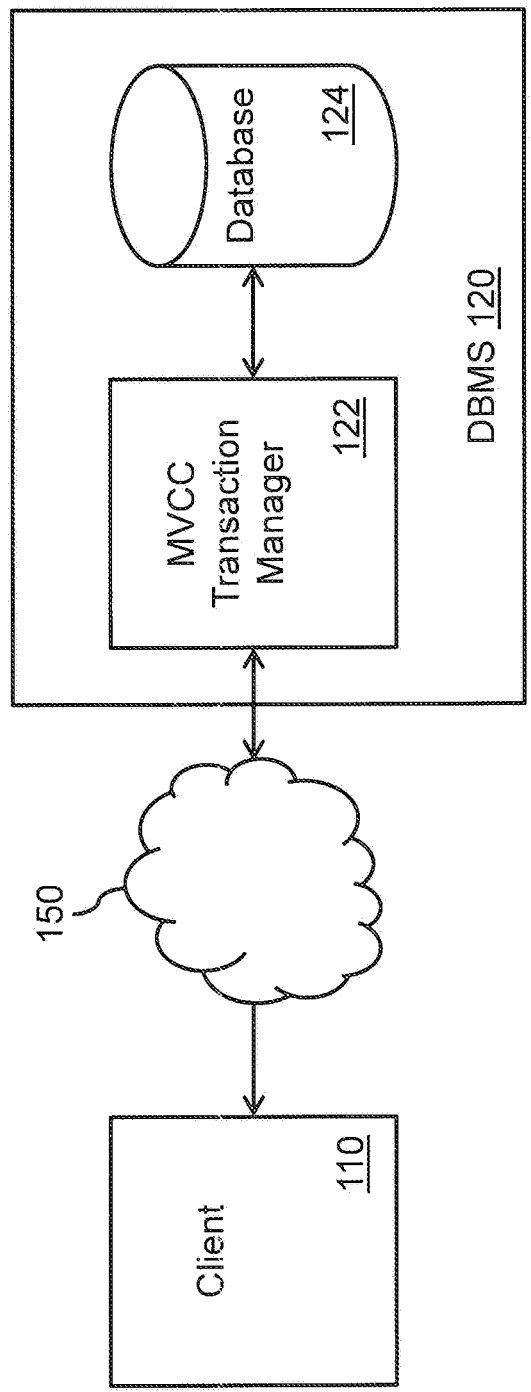
FIG. 1 is a block diagram illustrating a database system environment, according to an example embodiment.

FIG. 1 is a block diagram illustrating a database system environment 100, according to an example embodiment. Database system environment 100 includes one or more clients 110 and a database management system (DBMS) 120. DBMS 120 includes a multiversion concurrency control transaction manager 122, and a database 124. Clients 110a-b may communicate with DBMS 120 through a network 150. Network 150 may be any communications network for transmitting data electronically, including wired or wireless networks such as, for example, a Local Area network (LAN), a Wide Area Network (WAN), the Internet, etc.

Clients 110 may be any computing devices configured to access database 124, such as, for example, computers, laptops, mobile devices, servers, etc.

Database 124 may be any database system configured to store data, handle data transactions, and retrieve data in response to queries.

Transaction manager 122 may be implemented as part of a database management system configured to manage the structure, the storing, and the retrieval of data from database 124. Transaction manager 122 manages database transactions, such as read, write, and update commands, and handles commit operations to provide a consistent view of the database during concurrent database accesses by clients.

Figure 2A:
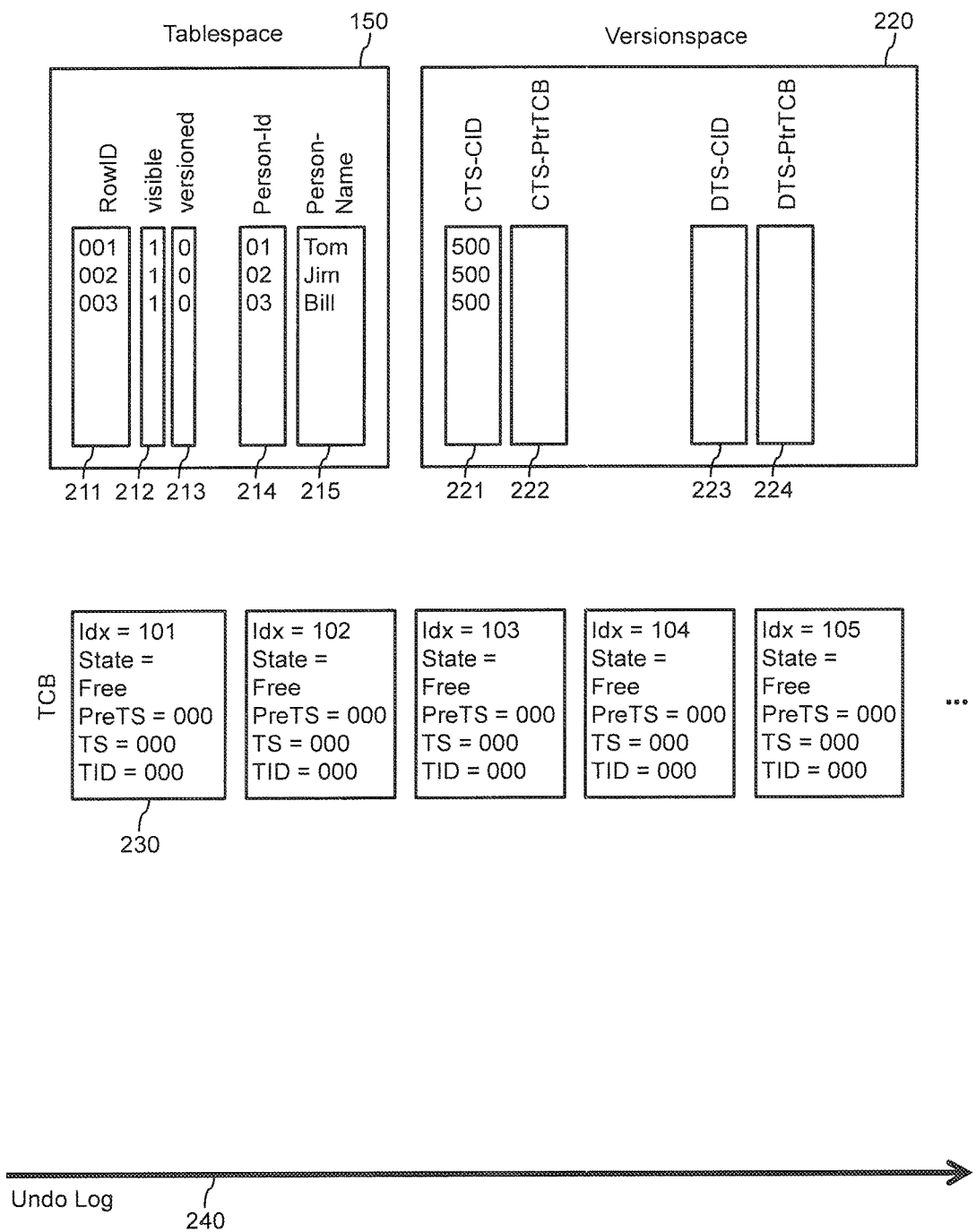

FIG. 2A illustrates an MVCC structure 200 maintained by transaction manager 122 for providing multiversion concurrency control, according to an example embodiment. MVCC structure 200 includes a tablespace segment 210, a versionspace segment 220, and one or more transaction control blocks (TCBs) 230.

Tablespace segment 210 stores the content of database 124, that is, tables comprising a series of rows and columns. In an embodiment, the rows of tables in tablespace segment 210 contain the following columns: RowID 211, Visible 212, Versioned 213, and data columns. In the example illustrated herein, tablespace 210 contains a PERSON table with data columns Person-Id 214 and Person-Name 215.

Versionspace segment 220 contains rows, corresponding to the same rows on tablespace segment 210, that store version information for database 124's data. The rows on versionspace segment 220 contain the following columns: Create Timestamp Commit Identifier (CTS-CID) 221, Create Timestamp Pointer to TCB (CTS-PtrTCB) 222, Destroy Timestamp Commit Identifier (DTS-CID) 223, and Destroy Timestamp Pointer to TCB (DTS-PtrTCB) 224.

Each TCB 230 corresponds to an atomic database transaction. An atomic database transaction may be a group of one or more operations, such as read and write operations, that are committed together. A TCB 231 maintains commit information for a transaction, which can be used by a reader process to determine what version of data should be returned in response to a read operation. Each TCB contains an index value 231, a state value 232, a PreTimestamp (PreTS) 233, a Timestamp 234, and a Transaction ID (TID) 235.

FIGS. 2A through 2I illustrate the contents of the MVCC structure 200 as a sequence of database transactions takes place, according to an example embodiment.

FIG. 2A shows exemplary initial contents of tablespace 210 and versionspace 220, according to an embodiment. On tablespace 210, the PERSON table contains three rows of data associated with three persons, Tom, Jim, and Bill, with person IDs 01, 02, and 03, respectively. Initially, the three rows have a visible flag set, indicating that the row is visible, and can be returned without checking for versions. On versionspace 220, CTS-CID 221 has a CID timestamp value of 500 for all three rows, indicating that the three rows were committed at time 500.

Figure 2B:
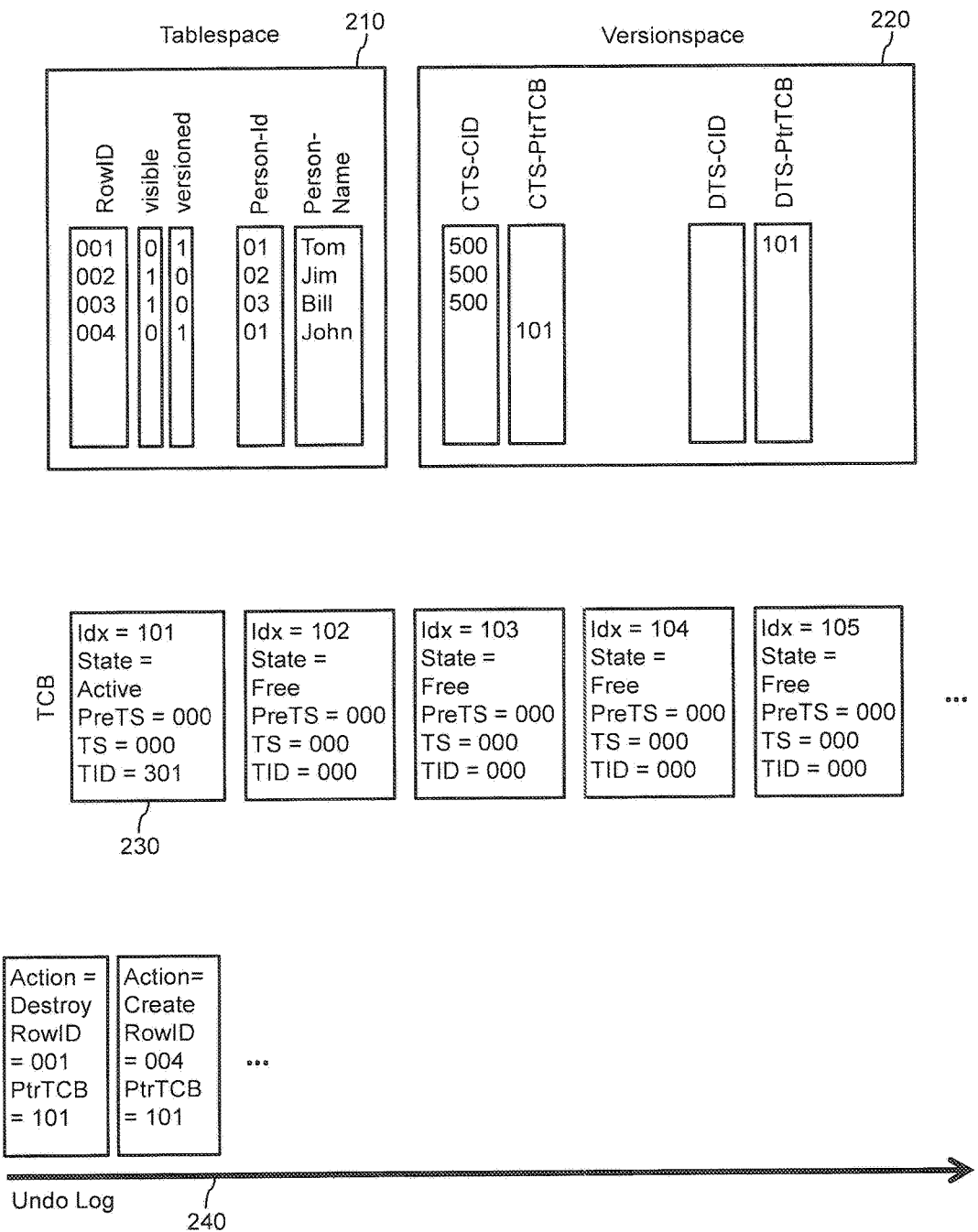

FIG. 2B shows the contents of database 124 after a transaction for updating the Person-name value for person-ID 001 is initiated, according to an embodiment. In this example, a transaction 301 may be executed similarly to a database query such as: UPDATE "PERSON" SET "NAME"='John' WHERE "ID"='01'.

FIG. 2B also shows undo log 240, which contains a list of database operations in the order executed. Undo log 240 may store information for the rollback of transactions and the clean up of TCB pointers in versionspace 220, as explained in detail below. In the example shown, the database—in executing the UPDATE query—executes a Destroy operation for row 1 and a create operation for row 4 as a single transaction, so transaction manager 122 adds these operations to undo log 240 and associates them to the same PtrTCB-101. Thus, the TCB with index 101 holds the commit information for these operations as a single transaction, with transaction identifier 301.

Transaction manager 122 adds row 4 to tablespace 210, clears the visible flag and sets the versioned flag for both rows 1 and 4. Clearing the visible flag indicates that the row is not visible or that versions should be checked before determining a visibility state. Clearing the versioned flag indicates that version information exists in versionspace, which should be checked to determine the visibility state of the corresponding physical row.

Transaction manager 122 also adds a CTS-PtrTCB value of 101 to row 4, indicating that commit information for the creation of this row can be found at TCB index 101. Likewise, transaction manager 122 adds a DTS-PtrTCB value of 101 to row 1, indicating that commit information for the destruction of this row can be found at TCB index 101. In this manner, transaction manager 122 links all rows associated to an atomic transaction to the same TCB.

Figure 2C:
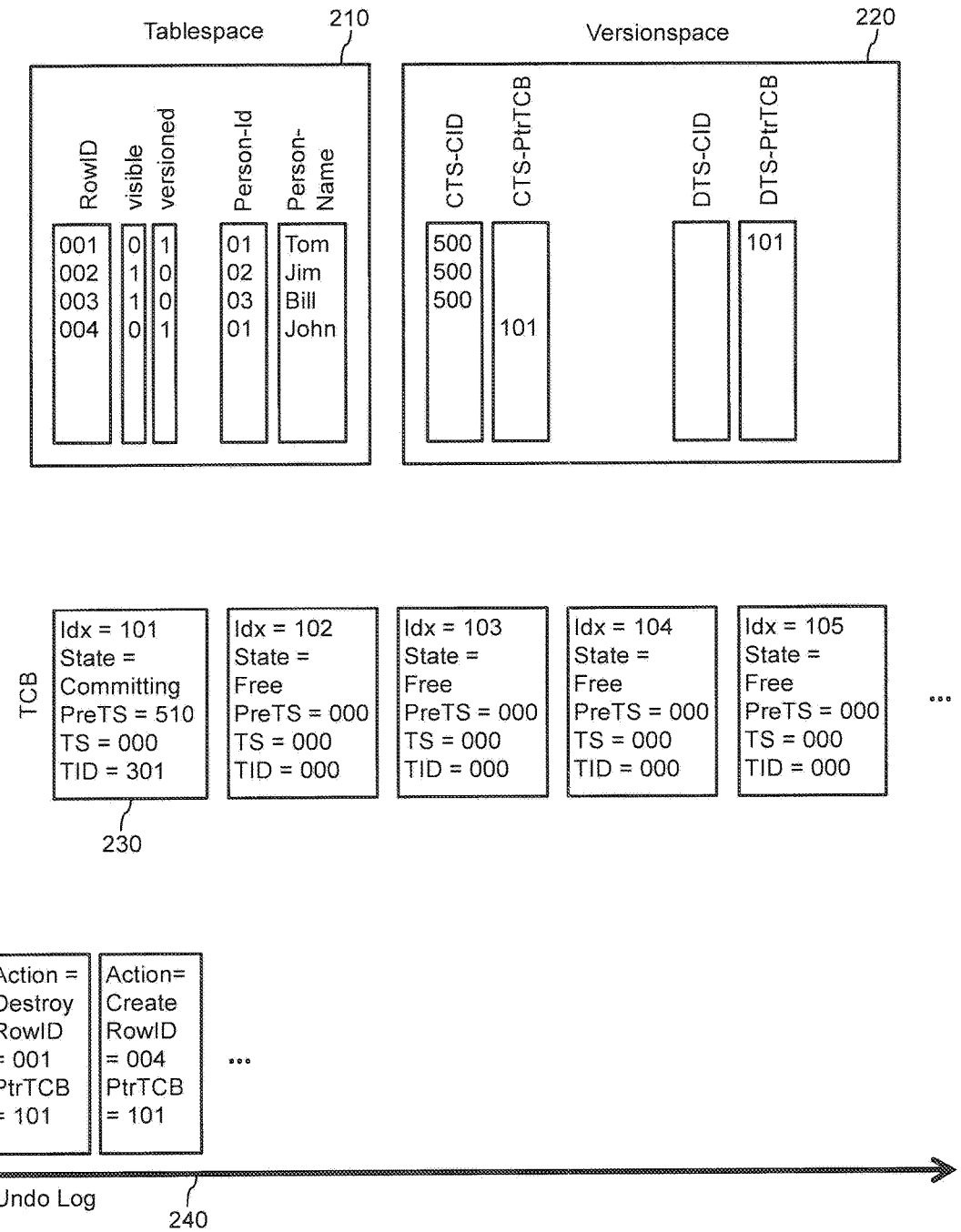

FIG. 2C shows the contents of database 124 after commit of transaction 301 is initiated, according to an embodiment. Transaction manager 122 updates the state of TCB at index 101 with to "Committing" and sets a value of Pre-Timestamp to 510, the time at which the committing started.

Figure 2D:
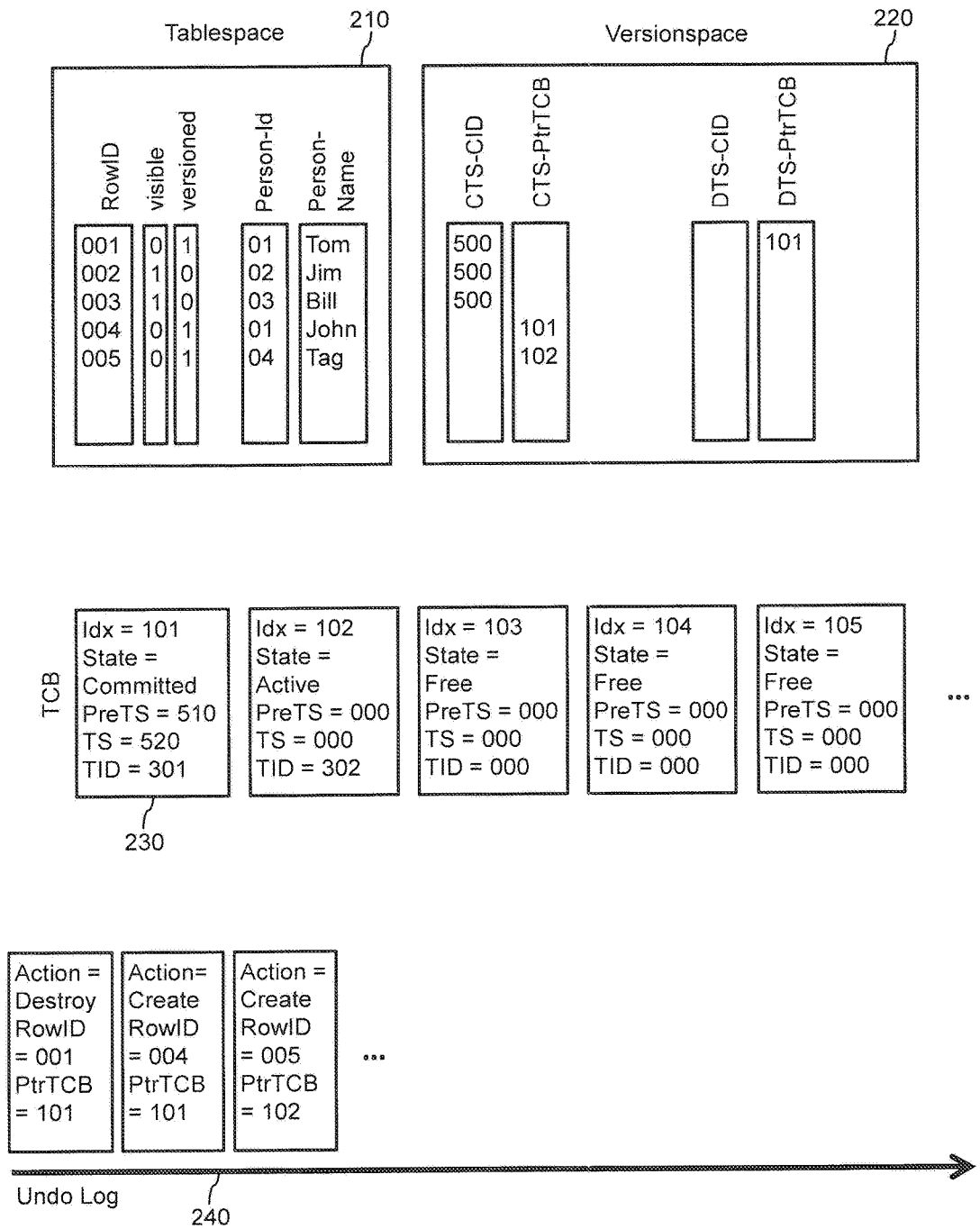

FIG. 2D shows the contents of database 124 after a transaction 302 for inserting a new person into the database is initiated, according to an embodiment. In this example, a transaction 302 may be executed similarly to a database query such as: INSERT INTO "PERSON" VALUES('04', 'Tag').

Transaction manager 122 adds row 5 to tablespace 210 for the new person, clears the visible flag and sets the versioned flag. Transaction manager 122 also assigns TCB at index 102 to transaction 302 and State=Active. CTS-PtrTCB is set to index 102 for row 5, linking the row to its corresponding TCB.

The example in FIG. 3D also shows that transaction 301 has committed at time 520. Transaction manager 122 sets the Timestamp value to 520 and sets the State to "Committed." Thus, the translation manager 122 completes the commit of transaction 301 by modifying the TCB for the transaction.

Figure 2E:
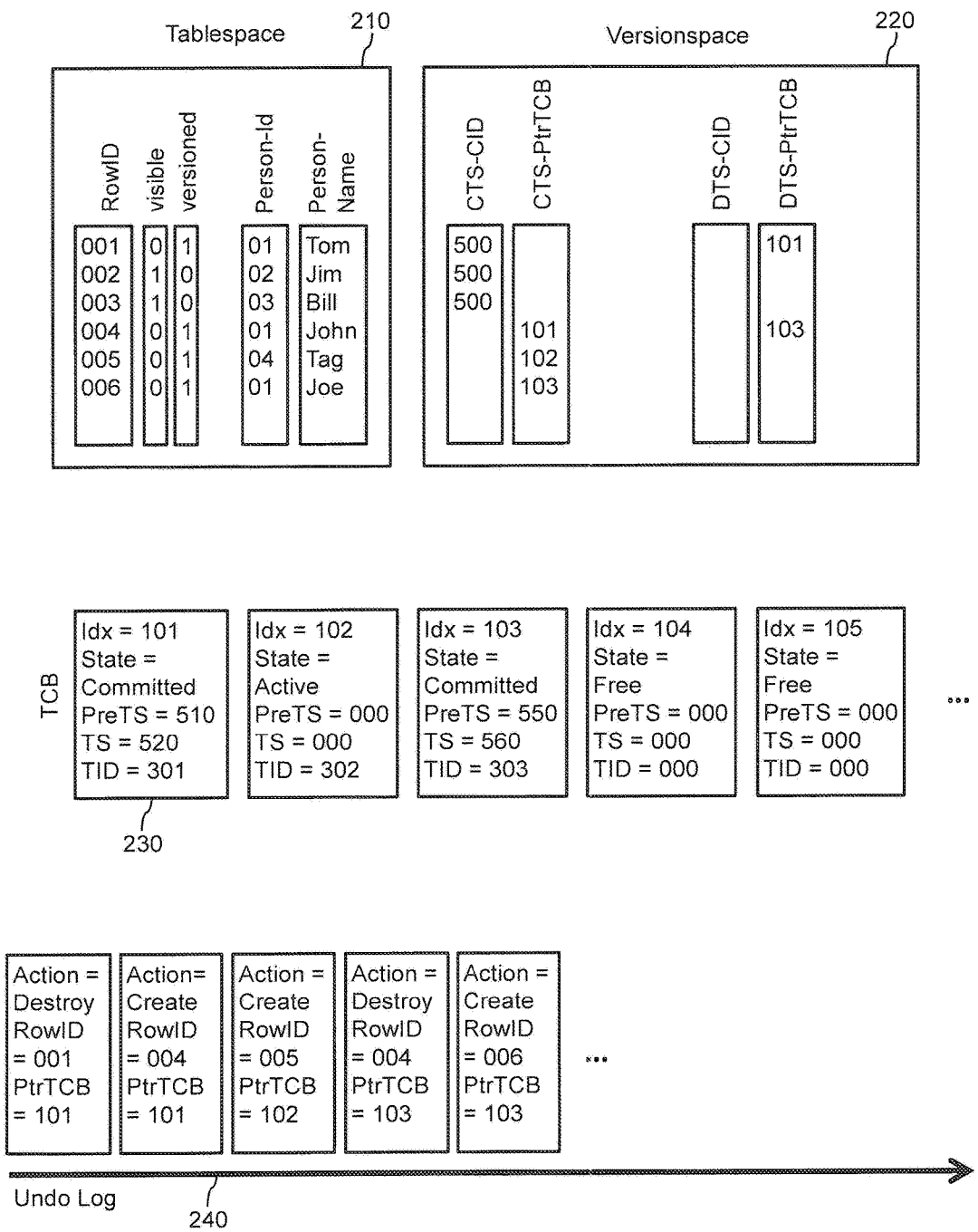

FIG. 2E shows the contents of database 124 after the initiation and commit of a transaction 303 for updating the name of Person-ID 01 to Joe, according to an embodiment. In this example, a transaction 303 may be executed similarly to a database query such as: UPDATE "PERSON" SET "NAME"='Joe' WHERE "ID"='01'.

In executing the UPDATE query, transaction manager 122 executes a Destroy operation for row 4 and a create operation for row 6 as a single transaction, so transaction manager 122 adds these operations to undo log 240 and associates them to the same PtrTCB=103. Transaction manager 122 also adds a CTS-PtrTCB value of 103 to row 6, indicating that commit information for the creation of this row can be found at TCB index 103. Likewise, transaction manager 122 adds a DTS-PtrTCB value of 103 to row 4, indicating that commit information for the destruction of this row can be found at TCB index 103.

Figure 2F:
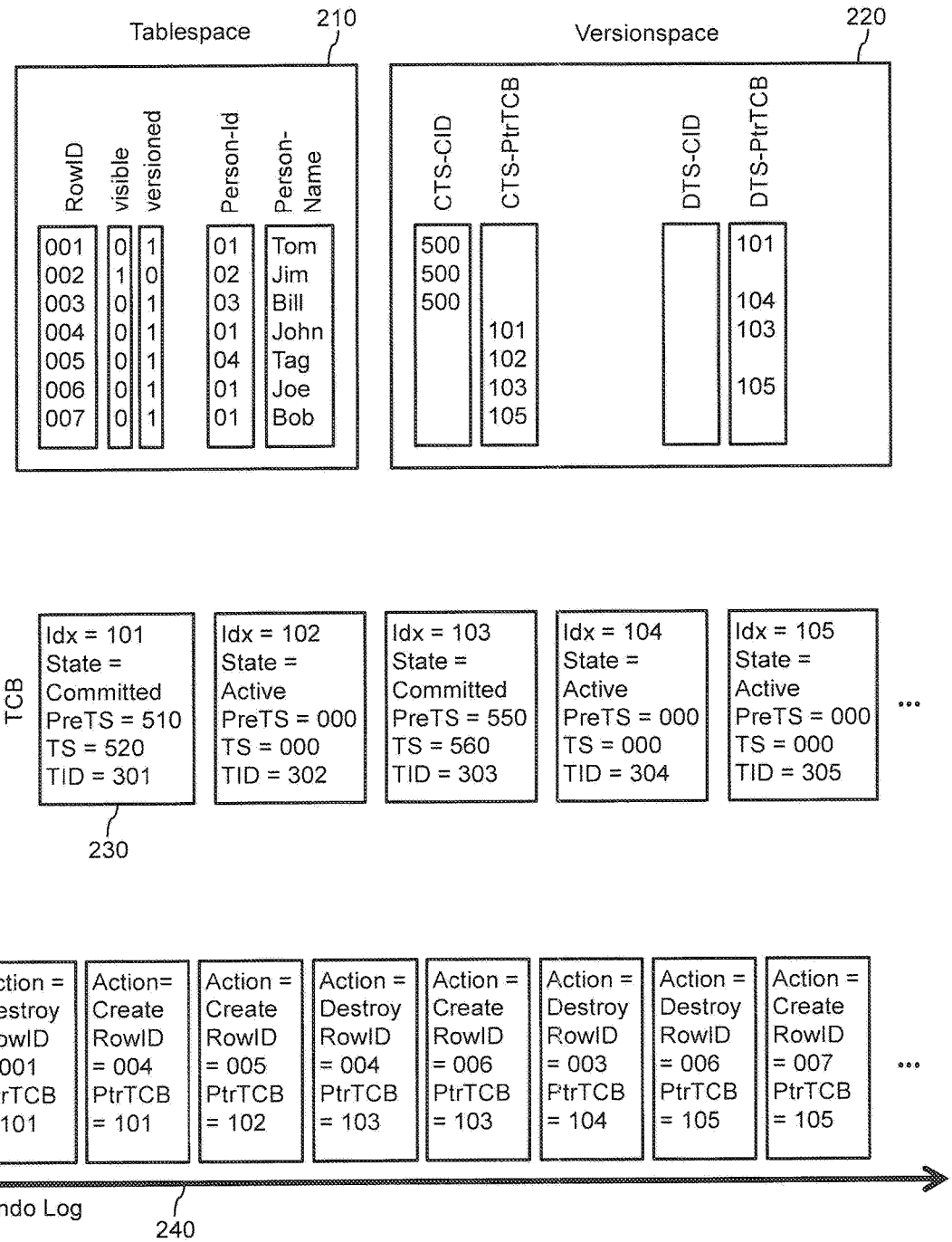

FIG. 2F shows the contents of database 124 after two transactions: transaction 304 for deleting Person-ID 3 and transaction 305 for updating the name of Person-ID 01 to Bob, according to an embodiment. In this example, a transaction 304 may be executed similarly to a database query such as: DELETE FROM "PERSON" WHERE A transaction 305 may be executed similarly to a database query such as: UPDATE "PERSON" SET "NAME"='Bob' WHERE "ID"='01'.

In executing the DELETE query, transaction manager 122 assigns the TCB at index 104 to transaction 304, and thus sets the DTS-PtrTCB to 104 for row 3. As above with the above UPDATE queries, translation manager 122 assigns TCB at index 105 to transaction 305, and thus sets DTS-PtrTCB to 105 for row 6 and CTS-PtrTCB to 105 for row 7.

Figure 2G:
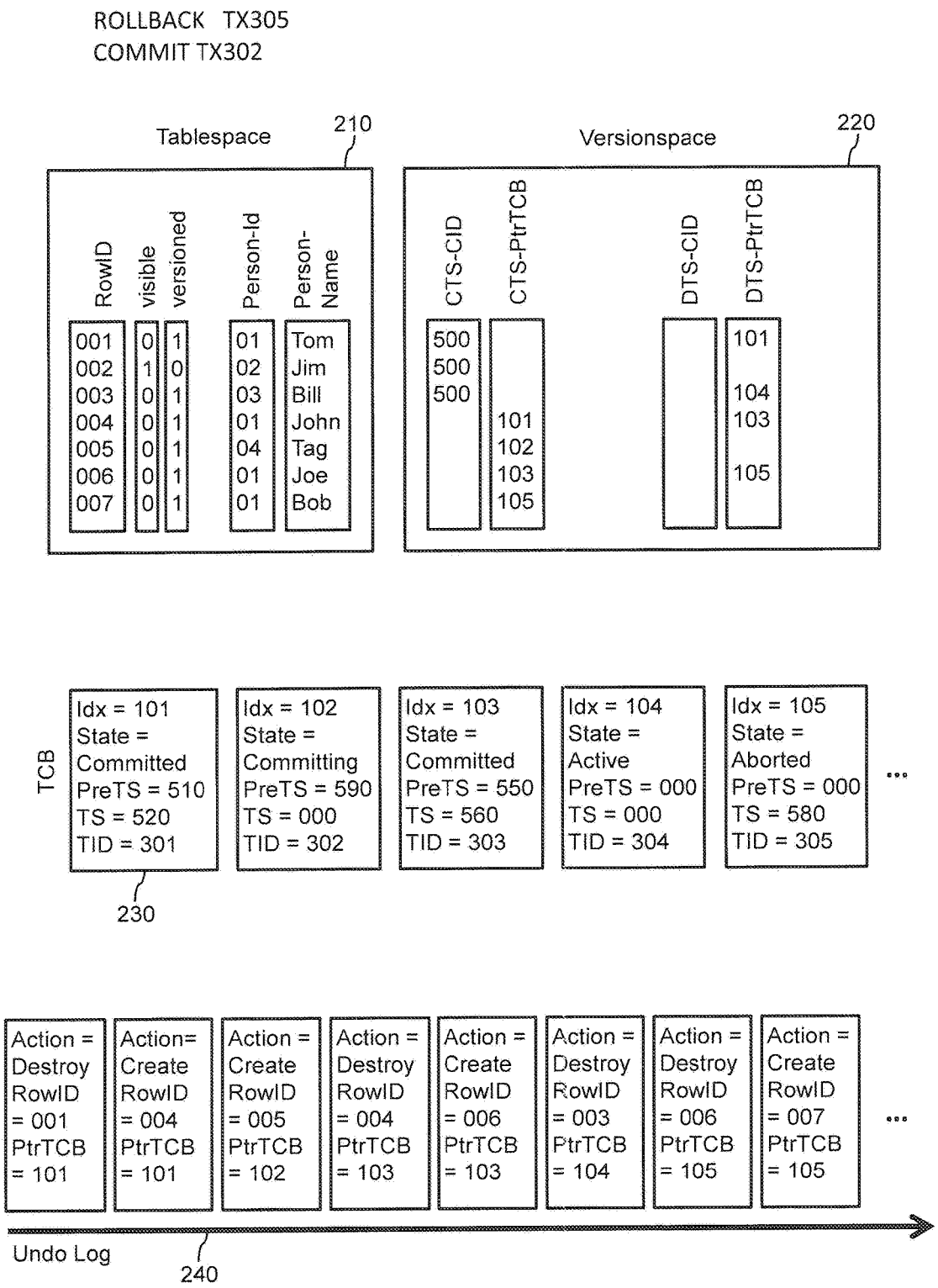

FIG. 2G shows the contents of database 124 after a rollback operation for transaction 305, and committing transaction 302, according to an embodiment.

To rollback transaction 305, which was not yet committed, the transaction manager may set the state of TCB 105 to "Aborted" and record the time at which the transaction was rolled back, in this example, time 580. When starting the commit, transaction manager sets the Pre-Timestamp of the corresponding TCB at index 102 to time 590.

Figure 2H:
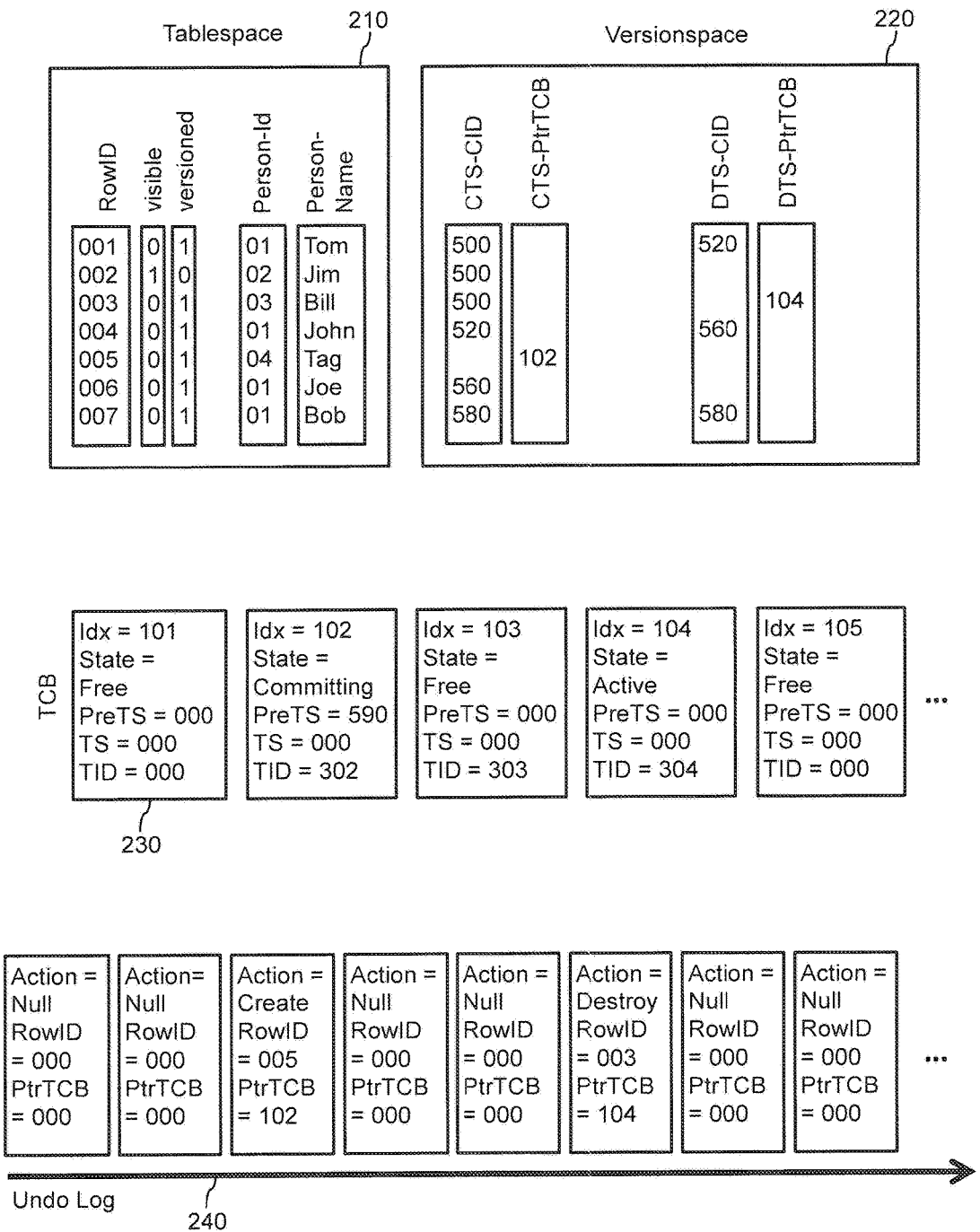
Figure 21:
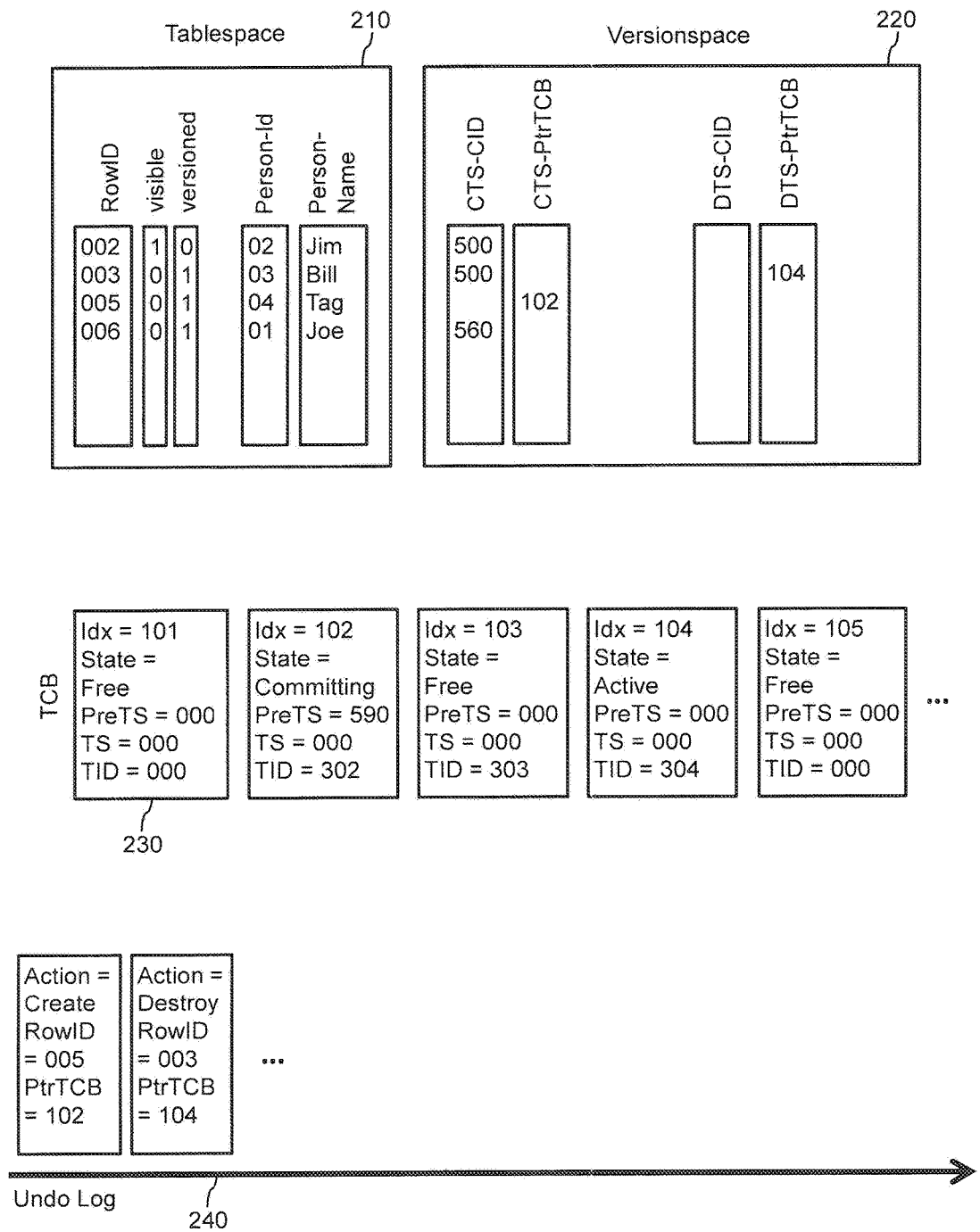

FIG. 2H shows the contents of database 124 after completing a cleanup of undo log 240, according to an embodiment.

In an embodiment, to perform the cleanup, transaction manager 122 checks the pointers to the TCB to move the commit information from the TCB to versionspace 220. For all rows with a CTS-PtrTCB pointer, transaction manager 122 checks the corresponding TCB to see whether the transaction has Committed or been Aborted. If either, transaction manager 122 can perform the cleanup of these rows by copying the timestamp value of the TCB to the CTS-CID column. Likewise for all rows with a DTS-PtrTCB pointer, transaction manager 122 may check the corresponding TCB to see whether the transaction has Committed or Aborted. If either, transaction manager 122 can perform the cleanup of these rows by copying the timestamp value of the TCB to the DTS-CID column. In an embodiment, if the transaction is Active or still Committing, transaction manager 122 does not cleanup the row, i.e., does not modify the rows, TCB or undo log 240 entries.

Transaction manager 122 can also clear the values of the corresponding TCB and undo log 240 entries for the rows that were cleaned up. In an embodiment, transaction manager 122 sets the TCB states to "Free" and the undo log 240 entry Action values to Null.

FIG. 2I shows the contents of database 124 after a garbage collection process, according to an embodiment.

In an embodiment, a garbage collection process removes destroyed data from the database. In an embodiment, transaction manager 122 may remove a row when the Consistent View Timestamp (CVTS) of all read requests is greater than the destroy time of the row. The CVTS is the time of the database snapshot that is returned in response to the read transaction. In an embodiment, transaction manager 122 eliminates rows that have been destroyed and whose destroyed transaction has been committed. These rows have an existing DTS-CID value. In this example, rows 001, 004, and 007 from FIG. 3H are deleted from the database.

In an embodiment, transaction manager 122 may maintain a "minimum read timestamp" to perform garbage collection. The minimum read timestamp can indicate that all read requests in the system have a CVTS that is greater than or equal to the minimum read timestamp. Transaction manager 122 can rely on this timestamp to decide what rows can be garbage collected. In an embodiment, after removing rows as part of garbage collection, transaction manager 122 sets the visible flag for rows which have a CTS-CID without a DTS-CID and whose CTS-CID is less than or equal to the minimum timestamp. In this example, after garbage collection, the visible flag for the row is set and the versioned flag is not set for rows that are not removed. Thus, after garbage collection, these rows are visible and returned.

Figure 3:
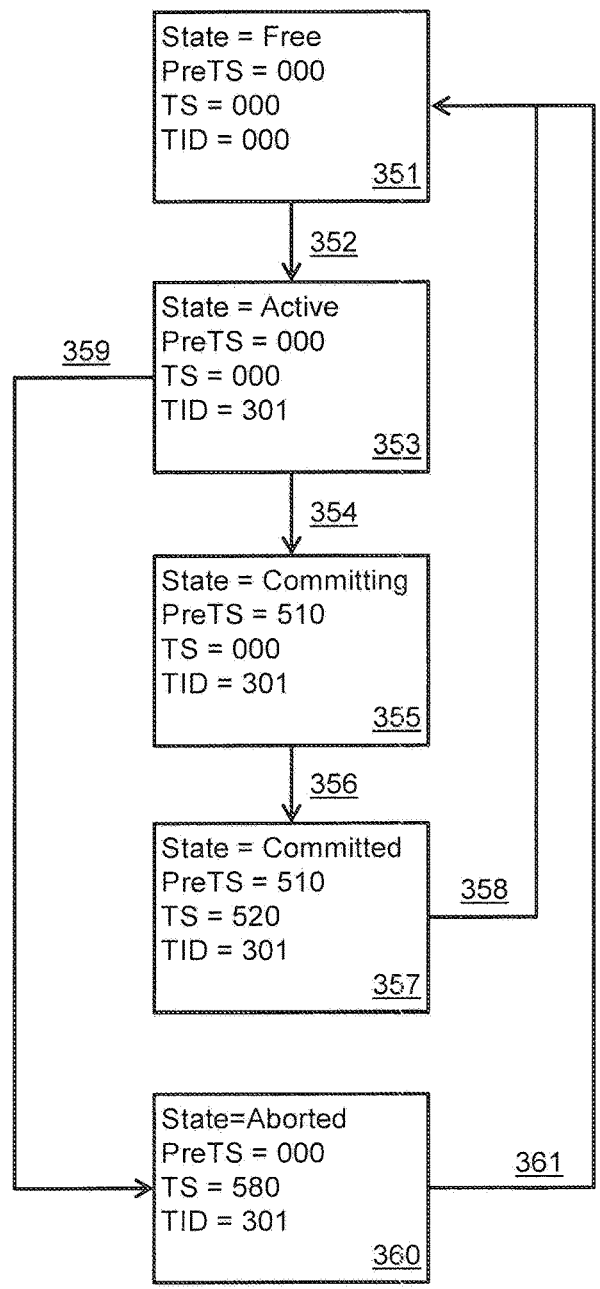
FIG. 3 is a state diagram illustrating the potential states that a transaction control block (TCB) can transition through, according to an example embodiment.

FIG. 3 is a state diagram illustrating the potential states that a TCB 230 can transition through, according to an example embodiment.

Initially, a TCB can be in the Free state 351. Once the TCB is allocated (transition 352) to a transaction, the TCB moves to the Active state 353 and the transaction ID (TID) is recorded. The Active state indicates that a transaction is stored in the database, but the commit process has not yet commenced.

Once the commit process begins (transition 354) the TCB moves to the Committing state 355. A PreTimestamp is recorded as the time when the commit process is initiated. When the commit process is finished (transition 356), the TCB moves to the Committed state 357, and a Timestamp for the completion time of the commit is recorded. The TCB may stay in the Committed state 357 until the TCB is cleaned up (transition 358), when it moves back to the Free state 351.

A transaction may be aborted before being committed (transition 359), and in that case the TCB moves to the Aborted state 359. A Timestamp for the time at which the transaction was aborted is recorded. The TCB may stay in the Aborted state 359 until the TCB is cleaned up (transition 361), when it moves back to the Free state 351.

FIGS. 4A-4E show flowcharts of a method 400 for performing a read transaction by transaction manager 122 in the multiversion concurrency control database using transaction control blocks, according to an example embodiment. Method 400 can be performed by processing logic that can comprise hardware (e.g., circuitry, dedicated logic, programmable logic, microcode, etc.), software (e.g., instructions run on a processing device), or a combination thereof.

At step 402, transaction manager 122 receives a read request for a tablespace 210 row. Transaction manager 122 checks the rows visible flag (step 404) and if it is set, returns the row (step 406). If the visible flag is not set as determined in step 404, transaction manager 122 checks the versioned flag (step 408). If at step 408 the versioned flag is not set, no row is returned and the read request ends (step 410). If at step 408 the versioned flag is set, the translation manager 122 checks the Destroy Timestamp (DTS) columns in versionspace starting at step 412 (FIG. 4B).

Figure 4A:
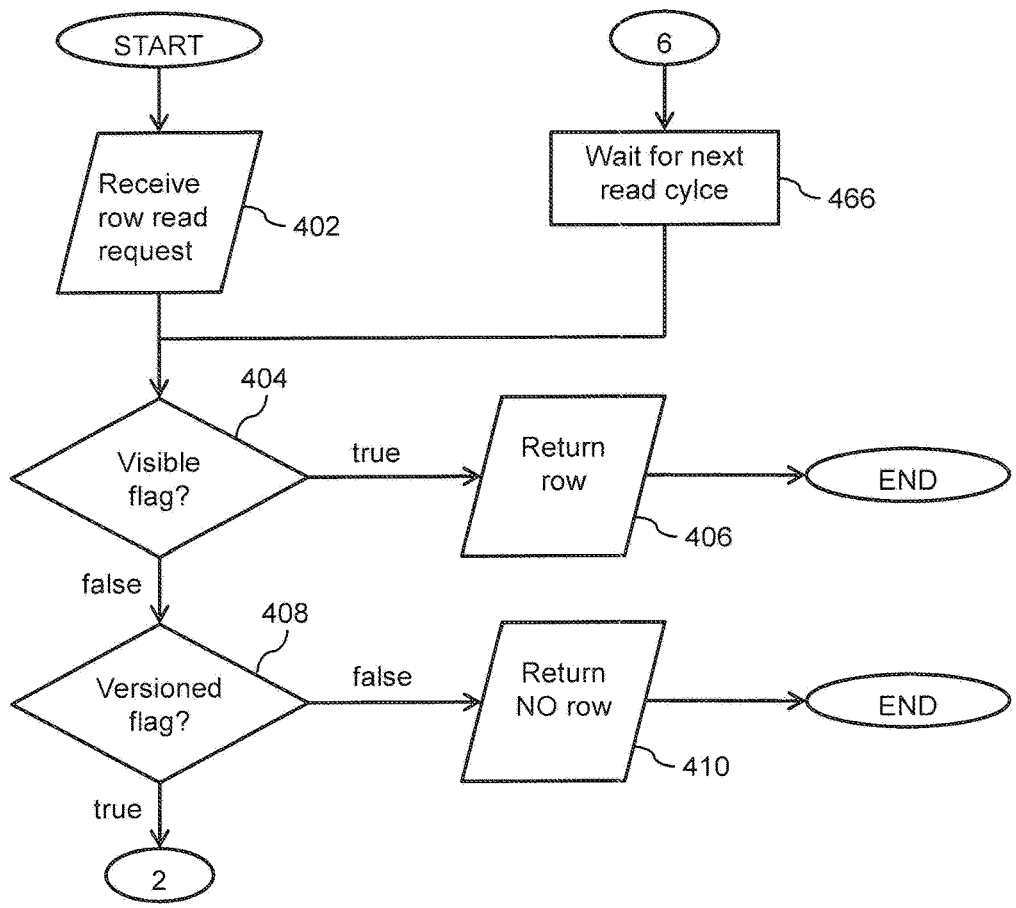
FIGS. 4A-E show flowcharts of a method for performing a read transaction by transaction manager in the multiversion concurrency control database using transaction control blocks, according to an example embodiment.
Figure 4B:
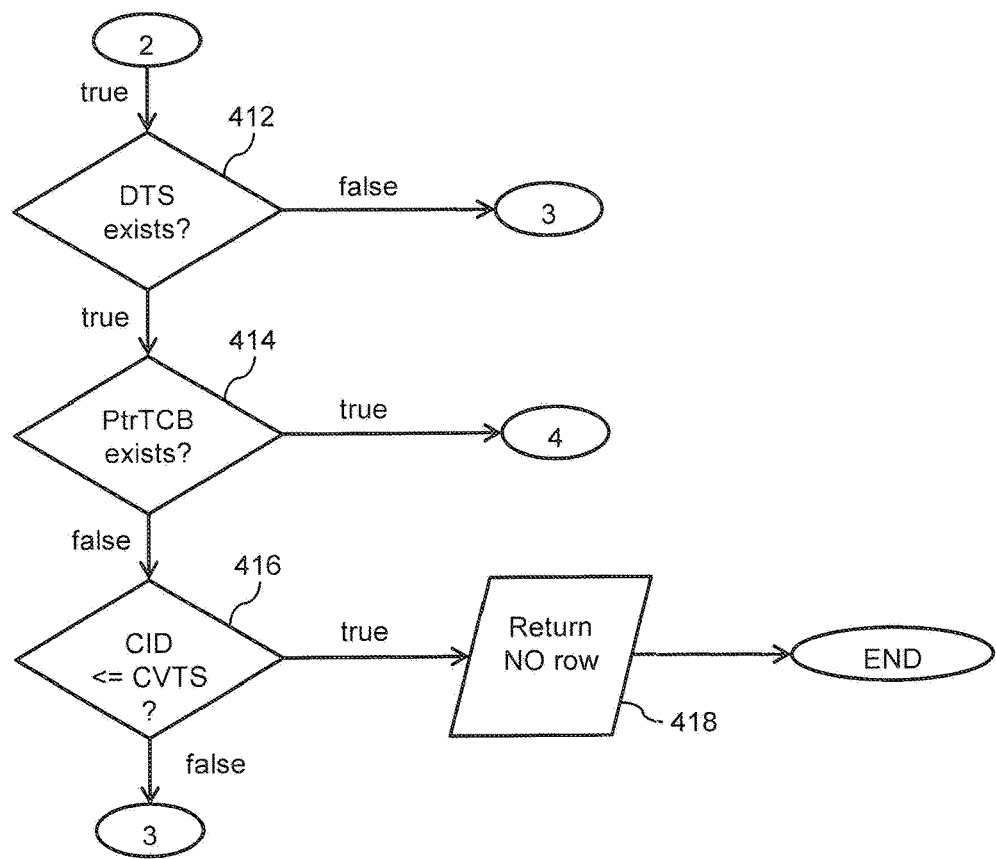

As shown in FIG. 4B, at step 412, transaction manager 122 determines whether a DTS value (DTS-CID or DTS-PtrTCB) exists for the row in versionspace 220. If no DTS value exists, translation manager 122 moves to step 420 to check Create Timestamp values, as described below with reference to FIG. 4C. If a DTS value exists, transaction manager 122 determines whether a DTS-PtrTCB exists (step 414). If a DTS-PtrTCB exists, transaction manager 122 moves to step 430 to check the TCB for a DTS value, as described below with reference to FIG. 4D.

If at step 414 a DTS-PtrTCB does not exist, in step 416 transaction manager 122 determines whether the DTS-CID is less than or equal to the Consistent View Timestamp of the read transaction (CVTS). The CVTS is the time of the database snapshot that is returned in response to the read transaction. If at step 416 the DTS-CID is less than or equal to the CVTS, transaction manager 122 returns no row and the read request ends (step 418). If at step 416 the DTS-CID is greater than the CVTS, transaction manager 122 moves to step 420 to check CTS values (FIG. 4C).

Figure 4C:
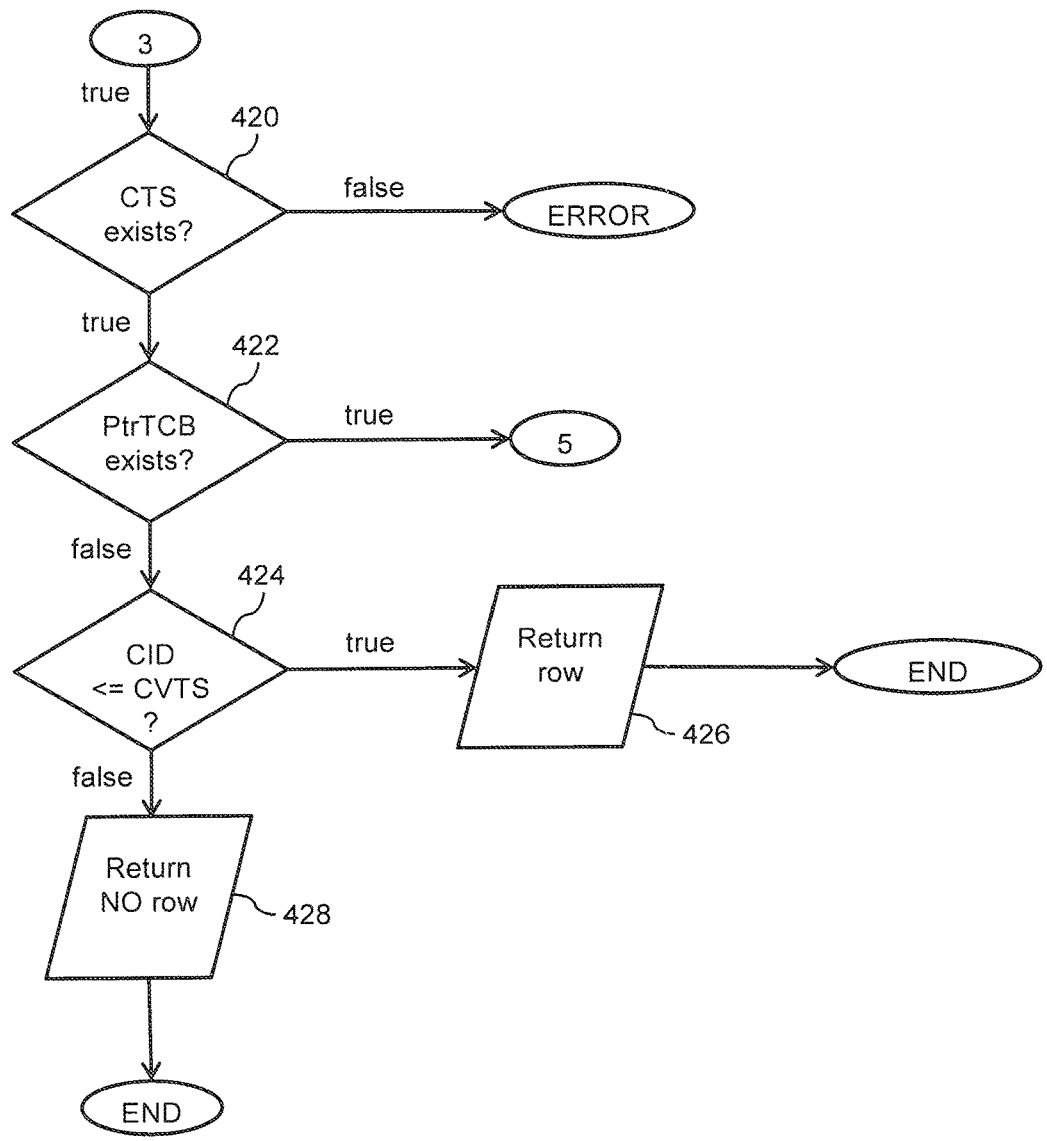

As shown in FIG. 4C, if at step 420 transaction manager 122 determines no CTS-CID or CTS-PtrTCB values exist, transaction manager 122 returns an error. Otherwise, transaction manager 122 determines if a CTS-PtrTCB exists (step 422), and if yes, moves to step 444 to check the TCB for a CTS, as described below with reference to FIG. 4E. If at step 422 no CTS-PtrTCB exists for the row, transaction manager 122 moves to step 424 and determines whether the CTS-CID is less than or equal to the CVTS. If yes, transaction manager 122 returns the row at step 426. Otherwise, it returns no row, as shown in step 428.

Figure 4D:
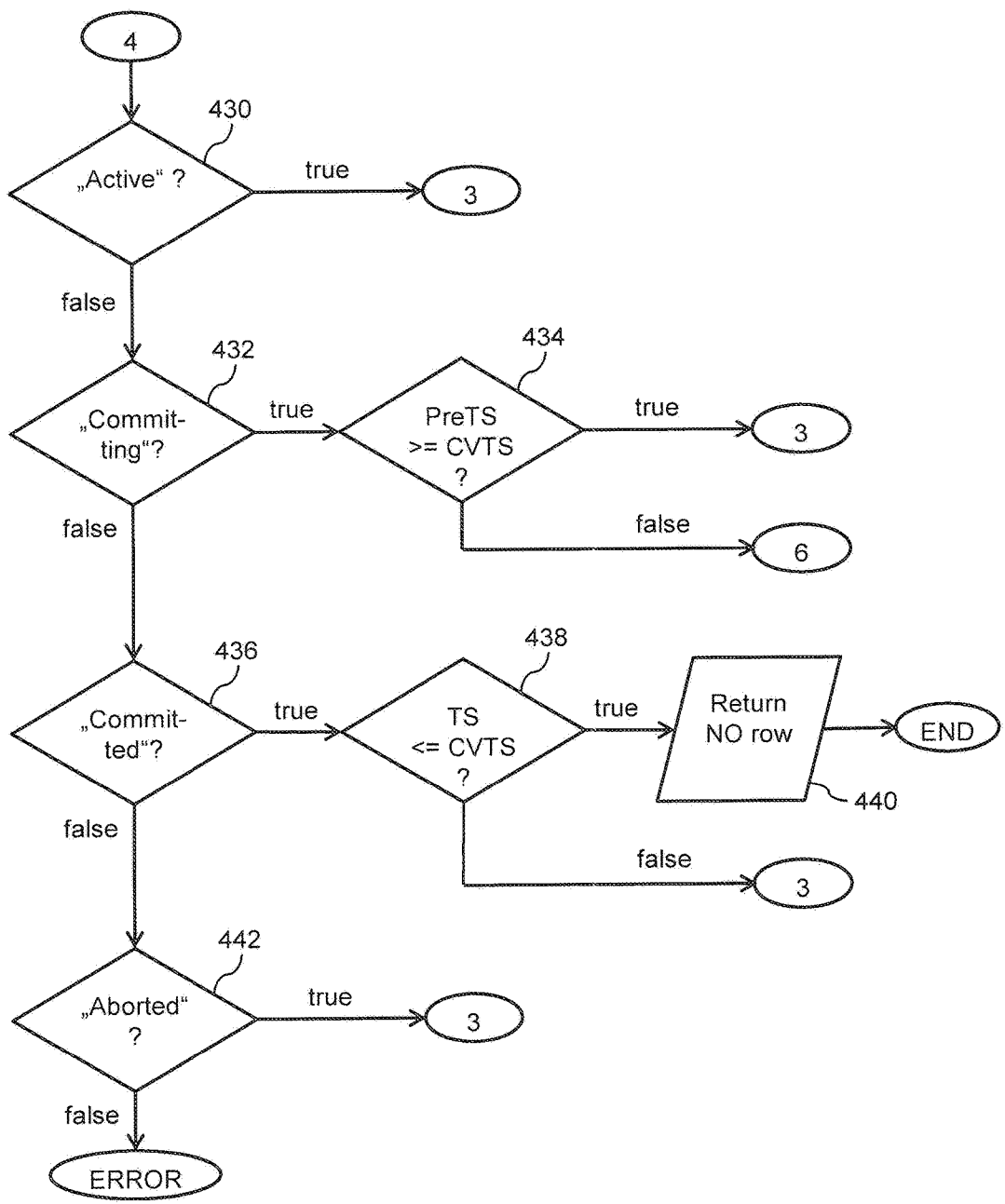

FIG. 4D describes steps for checking the TCB for a DTS that transaction manager 122 may perform when it determines that a DTS-PtrTCB exists in step 414 (FIG. 4B). At step 430, transaction manager 122 determines whether the TCB status is "Active." If yes, the row destruction transaction has not yet started committing, and transaction manager 122 moves to step 420 to check for a CTS (FIG. 4C).

At step 432, if the TCB state is "Committing," transaction manager 122 moves to step 434 and determines whether the PreTimestamp (PreTS) in the TCB is greater than or equal to the CVTS. If yes, the row destruction transaction has not yet started committing at the time of the read, so transaction manager 122 moves to step 420 (FIG. 4C) to check versionspace 220 for a CTS. If PreTS is less than the CVTS, transaction manager 122 moves to step 466 (FIG. 4A) and waits for the next read cycle.

At step 436, if the TCB state is "Committed," transaction manager 122 moves to step 438 and determines whether the Timestamp (TS) in the TCB is less than or equal to the CVTS. If yes, transaction manager 122 returns no row, as shown in step 440. If the TS is greater than the CVTS, transaction manager 122 moves to step 420 (FIG. 4C) to check versionspace 220 for a CTS.

At step 442, if the TCB state is "Aborted," transaction manager moves to step 420 (FIG. 4C) to check versionspace 220 for a CTS. If at this point the state is not "Aborted" then the TCB may be in an invalid state and an error is returned.

Figure 4E:
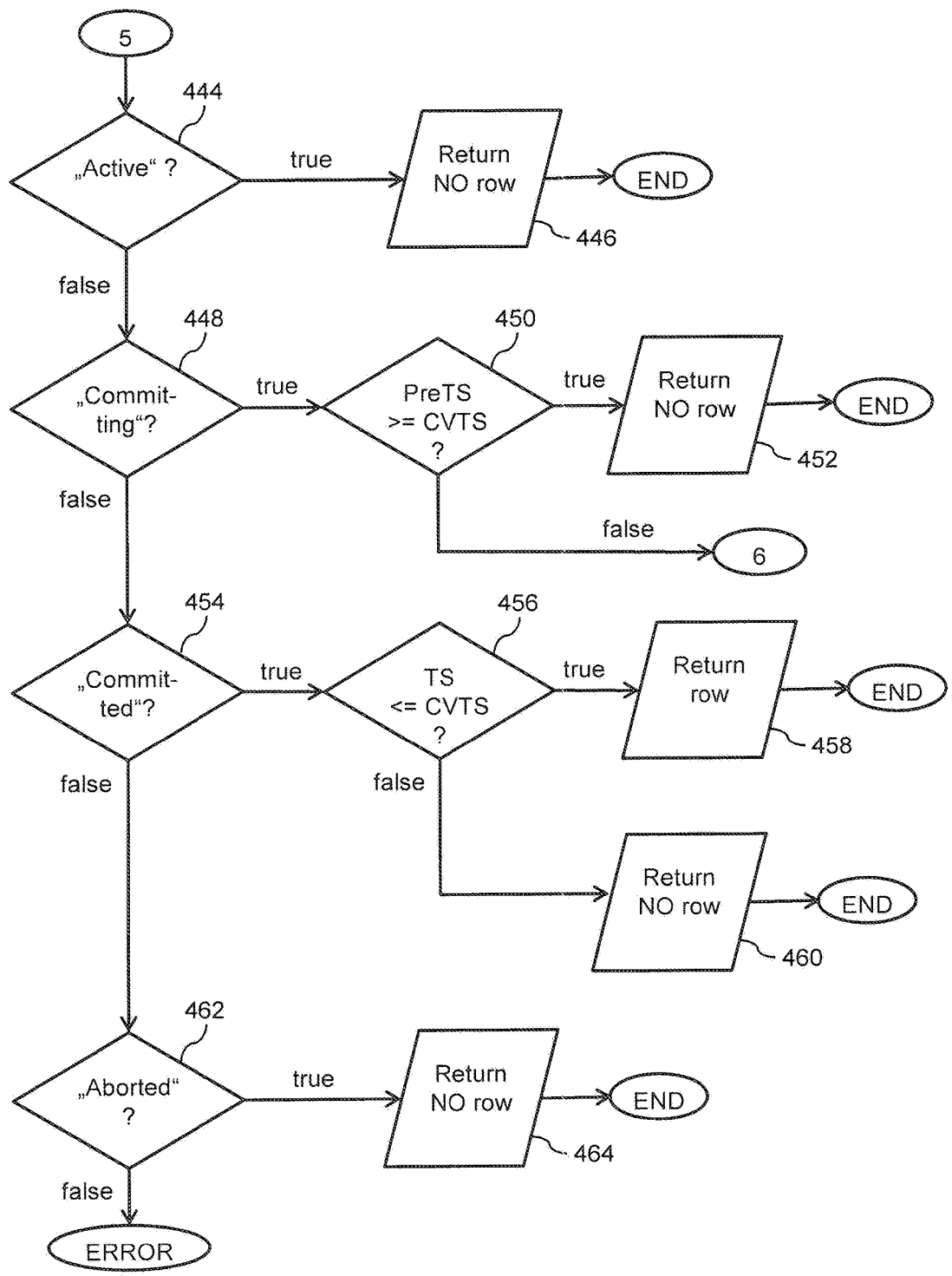

FIG. 4E describes steps for checking the TCB for a CTS that transaction manager 122 may perform when it determines that a CTS-PtrTCB exists in step 422 (FIG. 4C). At step 444, transaction manager 122 determines whether the TCB status is "Active." If yes, the row creation transaction has not yet started committing, and transaction manager 122 returns no row, as shown in step 446.

At step 448, if the TCB state is "Committing," transaction manager 122 moves to step 450 and determines whether the PreTimestamp (PreTS) in the TCB is greater than or equal to the CVTS. If yes, the row creation transaction has not yet started committing at the time of the read, so transaction manager 122 returns no row, as shown in step 452. If the PreTS is less than the CVTS, transaction manager 122 moves to step 466 (FIG. 4A) and waits for the next read cycle.

At step 454, if the TCB state is "Committed," transaction manager 122 moves to step 456 and determines whether the Timestamp (TS) in the TCB is less than or equal to the CVTS. If yes, transaction manager 122 returns the row, as shown in step 458. If the TS is greater than the CVTS, transaction manager 122 returns no row, as shown in step 460.

At step 462, if the TCB state is "Aborted," transaction manager returns no row, as shown in step 464. If at this point the state is not "Aborted" then the TCB may be in an invalid state and an error is returned.

Figure 5:
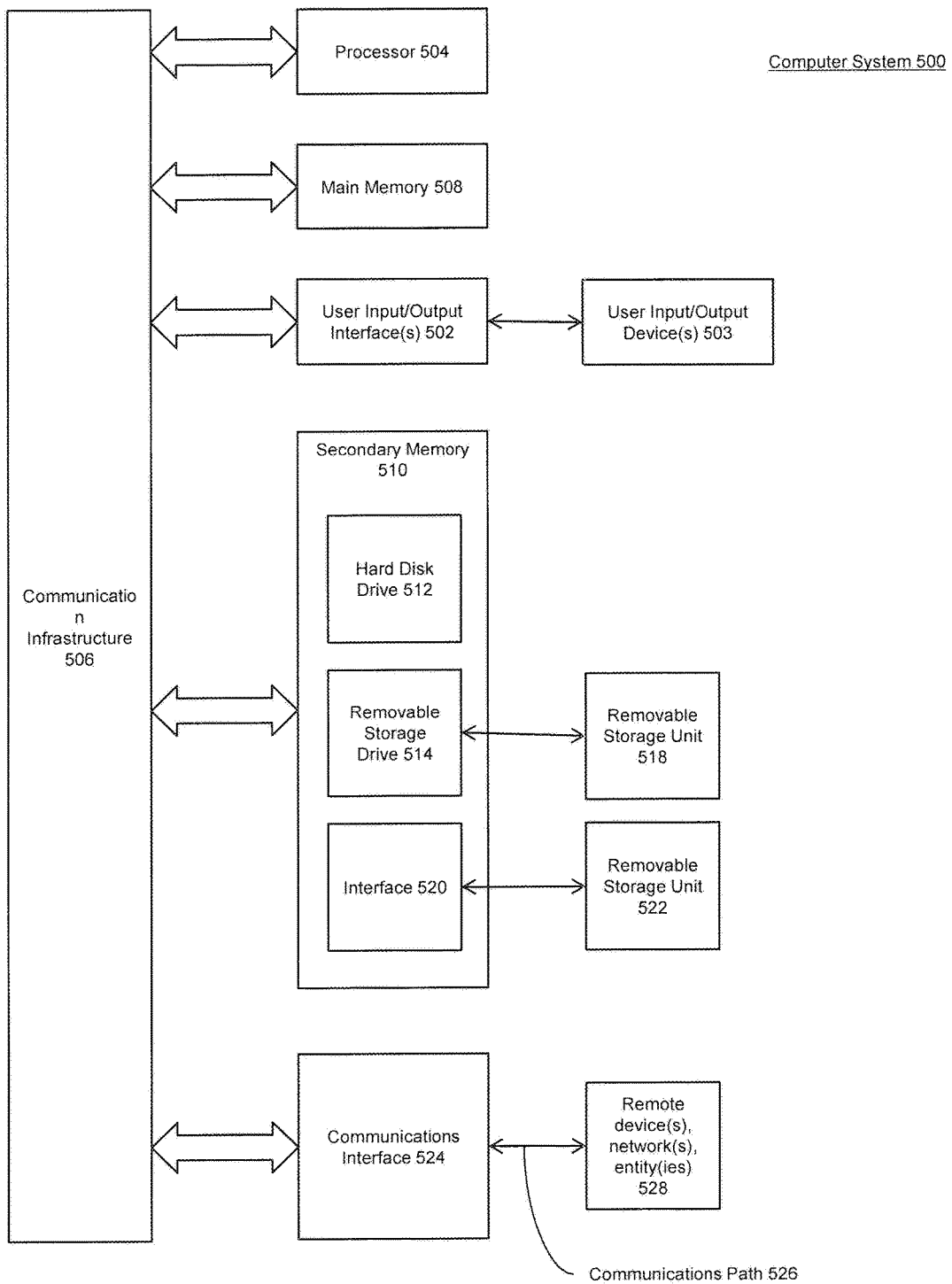
FIG. 5 is an example computer system useful for implementing various embodiments.

Various embodiments can be implemented, for example, using one or more well-known computer systems, such as computer system 500 shown in FIG. 5. Computer system 500 can be any well-known computer capable of performing the functions described herein.

Computer system 500 includes one or more processors (also called central processing units, or CPUs), such as a processor 504. Processor 504 is connected to a communication infrastructure or bus 506.

One or more processors 504 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 also includes user input/output device(s) 503, such as monitors, keyboards, pointing devices, etc., that communicate with communication infrastructure 506 through user input/output interface(s) 502.

Computer system 500 also includes a main or primary memory 508, such as random access memory (RAM). Main memory 508 may include one or more levels of cache. Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

In an embodiment, a tangible apparatus or article of manufacture comprising a tangible computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 5. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer implemented method for reading versioned data in a database, comprising:
    receiving, by at least one processor, a read request for a row in the database, wherein the row is linked to a particular transaction control block data structure that stores commit information for only a corresponding single atomic database transaction comprising a set of operations associated with the row that are committed together;
    determining, by the at least one processor, that the row is versioned;
    determining, by the at least one processor, that a first timestamp information for a row destroy operation associated with the row exists in the transaction control block;
    determining, by the at least one processor, that a second timestamp information for a row create operation associated with the row exists in the transaction control block; and
    providing, by the at least one processor, a version of the row based on comparing a consistent view timestamp with the first timestamp information or the second timestamp information, wherein the consistent view timestamp represents a time of a database snapshot corresponding to the read request.

2. The method of claim 1, wherein the providing further comprises providing the version of the row when the consistent view timestamp and the first timestamp information indicate the row destroy operation had not committed at a time of the consistent view timestamp.

3. The method of claim 1, wherein the providing further comprises providing the version of the row when the consistent view timestamp and the second timestamp information indicate the row create operation had committed at the consistent view timestamp.

4. The method of claim 1, wherein the transaction control block comprises a transaction state indicator and a transaction identifier, wherein the transaction identifier is associated with the single atomic database transaction.

5. The method of claim 4, further comprising:
    deriving commit information from the transaction control block; and
    storing the derived commit information into a version information structure associated with a plurality of rows associated with at least one of the set of operations.

6. The method of claim 4, wherein the providing further comprises providing the version of the row based on the transaction state indicator.

7. The method of claim 1, wherein the transaction control block is updated in response to the atomic database transaction being committed.

8. A system, comprising:
    a memory; and
    at least one processor coupled to the memory and configured to:
    receive a read request for a row in a database, wherein the row is linked to a particular transaction control block data structure that stores commit information for only a corresponding single atomic database transaction comprising a set of operations associated with the row that are committed together;
    determine that the row is versioned;
    determine that a first timestamp information for a row destroy operation associated with the row exists in the transaction control block;
    determine that a second timestamp information for a row create operation associated with the row exists in the transaction control block; and
    provide a version of the row based on comparing a consistent view timestamp with the first timestamp information or the second timestamp information, wherein the consistent view timestamp represents a time of a database snapshot corresponding to the read request.

9. The system of claim 8, wherein to provide the at least one processor is configured to provide the version of the row when the consistent view timestamp and the first timestamp information indicate the row destroy operation had not committed at the consistent view timestamp.

10. The system of claim 8, wherein to provide the at least one processor is configured to providing the version of the row when the consistent view timestamp and the second timestamp information indicate the row create operation had committed at the consistent view timestamp.

11. The system of claim 8, wherein the transaction control block comprises a transaction state indicator and a transaction identifier, wherein the transaction identifier is associated with the single atomic database transaction.

12. The system of claim 11, the at least one processor further configured to:
    derive commit information from the transaction control block; and
    store the derived commit information into a version information structure associated with a plurality of rows associated with at least one of the set of operations.

13. The system of claim 11, wherein to provide the at least one processor is configured to provide the version of the row based on the transaction state indicator.

14. A non-transitory computer-readable device having instructions stored thereon that, when executed by at least one computing device, causes the at least one computing device to perform operations comprising:
    receiving a read request for a row in a database, wherein the row is linked to a particular transaction control block data structure that stores commit information for only a corresponding single atomic database transaction comprising a set of operations associated with the row that are committed together;
    determining that the row is versioned;

determining that a first timestamp information for a row destroy operation associated with the row exists in the transaction control block;

determining that a second timestamp information for a row create operation associated with the row exists in the transaction control block; and providing a version of the row based on comparing a consistent view timestamp with the first timestamp information or the second timestamp information, wherein the consistent view timestamp represents a time of a database snapshot corresponding to the read request.

15. The computer-readable device of claim 14, wherein the providing further comprises providing the version of the row when the consistent view timestamp and the first timestamp information indicate the row destroy operation had not committed at the consistent view timestamp.

16. The computer-readable device of claim 14, wherein the providing further comprises providing the version of the row when the consistent view timestamp and the second timestamp information indicate the row create operation had committed at the consistent view timestamp.

17. The computer-readable device of claim 14, wherein the transaction control block comprises a transaction state indicator and a transaction identifier, wherein the transaction identifier is associated with the single atomic database transaction.

18. The computer-readable device of claim 17, wherein the providing further comprises providing the version of the row based on the transaction state indicator.

* * * * *